United States Patent
Hosaka et al.

(10) Patent No.: US 9,573,569 B2
(45) Date of Patent: Feb. 21, 2017

(54) REGENERATIVE BRAKE DEVICE AND MOTOR-ASSISTED VEHICLE PROVIDED WITH THE SAME

(75) Inventors: Yasuo Hosaka, Tokyo (JP); Kazuo Asanuma, Tokyo (JP); Toshiyuki Kagawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 74 days.

(21) Appl. No.: 13/438,654

(22) Filed: Apr. 3, 2012

(65) Prior Publication Data

US 2012/0241264 A1 Sep. 27, 2012

Related U.S. Application Data

(63) Continuation of application No. PCT/JP2010/066342, filed on Sep. 22, 2010.

(30) Foreign Application Priority Data

Oct. 5, 2009 (JP) ................................ 2009-231908

(51) Int. Cl.
*B60T 8/64* (2006.01)
*B60T 1/10* (2006.01)
(Continued)

(52) U.S. Cl.
CPC .. *B60T 1/10* (2013.01); *B60L 7/14* (2013.01); *B60L 7/26* (2013.01); *B60L 11/007* (2013.01);
(Continued)

(58) Field of Classification Search
CPC ............ B60T 7/08; B60T 7/107; B60T 8/171; B60T 13/74; B60T 13/741; B60T 13/746; B60T 2270/60; B60T 2270/604; B60T 1/10; B60L 7/14; B60L 7/26; B60L 11/007; B60L 11/1801; B60L 11/1803; B60L 11/1877; B60L 2200/12; B60L 2250/10; B60L 2250/24; B60W 10/08; B60W 10/184; B60W 30/18127; B60W 2300/36; B60W 2540/12; B62M 6/45; B60Y 2200/12
(Continued)

(56) References Cited

U.S. PATENT DOCUMENTS 3,921,745 A 11/1975 McCulloch et al.
4,815,850 A 3/1989 Kanayama et al.
(Continued)

FOREIGN PATENT DOCUMENTS

CN 1244464 C 3/2006
DE 102 50 645 A1 7/2003
(Continued)

OTHER PUBLICATIONS

Japanese Office Action dated May 7, 2013, in a counterpart Japanese patent application No. 2009-231908.
(Continued)

*Primary Examiner* — Melody Burch
(74) *Attorney, Agent, or Firm* — Chen Yoshimura LLP (57) ABSTRACT

A regenerative brake device for a vehicle includes a manual brake configured to apply a brake to a wheel of the vehicle by a manual operation of a brake lever; a motor configured to be coupled to a wheel of the vehicle, the motor being driven by a power from a battery, and also alternatively acting as a regenerative brake that charges the battery with an electromotive force of the motor; a brake sensor that detects a manual brake application point at which the manual brake is actuated from an operation amount of the brake lever; and a power control unit that performs regenerative power control for charging the battery with the electromotive force of the motor based on an output signal (Continued)

from the brake sensor so that the regenerative brake is generated in accordance with the operation amount of the brake lever.

10 Claims, 8 Drawing Sheets

(51) Int. Cl.
| | | |
|---|---|---|
| *B60L 7/14* | (2006.01) | |
| *B60L 7/26* | (2006.01) | |
| *B60L 11/00* | (2006.01) | |
| *B60L 11/18* | (2006.01) | |
| *B60W 10/08* | (2006.01) | |
| *B60W 10/184* | (2012.01) | |
| *B62M 6/45* | (2010.01) | |
| *B60T 13/74* | (2006.01) | |
| *B60W 30/18* | (2012.01) | |

(52) U.S. Cl.
CPC ........ *B60L 11/1801* (2013.01); *B60L 11/1803* (2013.01); *B60L 11/1877* (2013.01); *B60W 10/08* (2013.01); *B60W 10/184* (2013.01); *B62M 6/45* (2013.01); *B60L 2200/12* (2013.01); *B60L 2250/10* (2013.01); *B60L 2250/24* (2013.01); *B60T 2270/604* (2013.01); *B60W 30/18127* (2013.01); *B60W 2300/36* (2013.01); *B60W 2540/12* (2013.01); *B60Y 2200/12* (2013.01); *Y02T 10/7005* (2013.01); *Y02T 10/705* (2013.01)

(58) Field of Classification Search
USPC .... 303/13, 20, 152; 188/156–158; 180/65.1, 180/220
See application file for complete search history.

(56) References Cited

U.S. PATENT DOCUMENTS

| | | | |
|---|---|---|---|
| 5,333,048 A | 7/1994 | Michel et al. | |
| 5,474,148 A | 12/1995 | Takata | |
| 5,542,754 A * | 8/1996 | Aoki et al. | 303/3 |
| 6,155,369 A * | 12/2000 | Whittaker | 180/220 |
| 6,320,336 B1* | 11/2001 | Eguchi | 318/139 |
| 6,371,574 B1* | 4/2002 | Hageman et al. | 303/113.4 |
| 6,446,745 B1* | 9/2002 | Lee et al. | 180/206.2 |
| 6,657,181 B1 | 12/2003 | Ishizuka et al. | |
| 6,933,836 B2* | 8/2005 | Hsu | 340/432 |
| 7,019,842 B2 | 3/2006 | Holzapfel et al. | |
| 7,117,978 B2* | 10/2006 | Kaczmarek | B66B 7/068 187/251 |
| 7,779,948 B2* | 8/2010 | Gulas | 180/206.5 |
| 2001/0017696 A1 | 8/2001 | Narita et al. | |
| 2004/0027105 A1* | 2/2004 | Nakamura et al. | 323/267 |
| 2004/0084238 A1* | 5/2004 | Yokotani et al. | 180/205 |
| 2006/0139616 A1 | 6/2006 | Jacobs et al. | |
| 2007/0126284 A1 | 6/2007 | Swain et al. | |
| 2007/0229843 A1 | 10/2007 | Sesko | |
| 2008/0054748 A1* | 3/2008 | Huber et al. | 310/102 R |
| 2012/0250031 A1 | 10/2012 | Ikeda et al. | |

FOREIGN PATENT DOCUMENTS

| | | |
|---|---|---|
| DE | 10 2006 019494 A1 | 10/2007 |
| DE | 10 2007 051559 A1 | 4/2009 |
| EP | 0 647 556 A2 | 4/1995 |
| EP | 1 415 904 A2 | 5/2004 |
| JP | 62-35223 A | 2/1987 |
| JP | H2-123902 A | 5/1990 |
| JP | 3-279812 A | 12/1991 |
| JP | H5-2502 U | 1/1993 |
| JP | H5-72088 A | 3/1993 |
| JP | H6-24302 U | 3/1994 |
| JP | 7-83612 A | 3/1995 |
| JP | H7-101375 A | 4/1995 |
| JP | 2623419 B2 | 6/1997 |
| JP | 9-254861 A | 9/1997 |
| JP | 9-308281 A | 11/1997 |
| JP | H11-227668 A | 8/1999 |
| JP | 2000-258124 A | 9/2000 |
| JP | 2000-356509 A | 12/2000 |
| JP | 2001-33209 A | 2/2001 |
| JP | 3317096 B2 | 8/2002 |
| JP | 2003-204602 A | 7/2003 |
| JP | 2004-149001 A | 5/2004 |
| JP | 2005-153842 A | 6/2005 |
| JP | 2007-271624 A | 10/2007 |
| JP | 2009-231845 A | 10/2009 |
| WO | 2011/043354 A1 | 4/2011 |

OTHER PUBLICATIONS

International Search Report (ISR) issued in PCT/JP2010/066342 mailed in Dec. 2010.
Japanese Office Action (of the related U.S. Appl. No. 13/438,615) dated Sep. 10, 2013 in counterpart Japanese patent application No. 2011-535409.
International Search Report (ISR) issued in PCT/JP2010/067487 (of the related U.S. Appl. No. 13/438,615) mailed in Dec. 2010.
Written Opinion (PCT/ISA/237) issued in PCT/JP2010/066342 mailed in Dec. 2010.
European Search Report dated Jul. 2, 2013, in a counterpart European patent application No. 10821857.9.
Japanese Office Action dated Jul. 29, 2014, in a counterpart Japanese patent application No. 2013-215399.
Taiwanese Office Action dated Nov. 26, 2014, in a counterpart Taiwanese patent application No. 099133892.
English translation of JPH2-123902, which has been submitted on Oct. 3, 2014.

* cited by examiner

REGENERATIVE BRAKE DEVICE AND MOTOR-ASSISTED VEHICLE PROVIDED WITH THE SAME

This application is a continuation of PCT International Application No. PCT/JP2010/066342 designating the United States, filed Sep. 22, 2010, which claims the benefit of Japanese Application No. 2009-231908, filed in Japan on Oct. 5, 2009. Both applications are hereby incorporated by reference in their entireties.

The present application also hereby incorporates by reference PCT International Application No. PCT/JP2010/067487, filed Oct. 5, 2010, which claims the benefit of Japanese Application No. 2009-231845, filed in Japan on Oct. 5, 2009, and Japanese Application No. 2010-084081, filed in Japan on Mar. 31, 2010 in their entireties.

TECHNICAL FIELD

The present invention relates to a regenerative brake device, and more particularly, to a regenerative brake device that is suitably used for a vehicle that has electric assist power in addition to human power, and an electric assist vehicle provided with the same.

BACKGROUND ART

Recently, from ecological and health standpoints, a bicycle equipped with an electric assist is drawing attention among those who have been using cars for transportation. Electric vehicles utilizing electric assisting power such as the electric assist bicycle and the like are provided with a torque sensor that detects human power, which is a force applied to pedals, and are configured to control the electric assisting power in accordance with the detection signal as exemplified in Patent Document 1 below.

Such vehicles equipped with the electric assist need to be able to travel a longer distance with a single charge of a battery that is provided therein. In view of this point, as shown in Patent Document 2 below, a technique of using a motor as a generator during deceleration such as braking so as to recoup energy, i.e., energy regeneration, and charging the battery with the energy has been disclosed.

RELATED ART DOCUMENTS

Patent Documents

Patent Document 1: Japanese Patent Publication No. 2623419
Patent Document 2: Japanese Patent Publication No. 3317096

SUMMARY OF THE INVENTION

Figure 8:
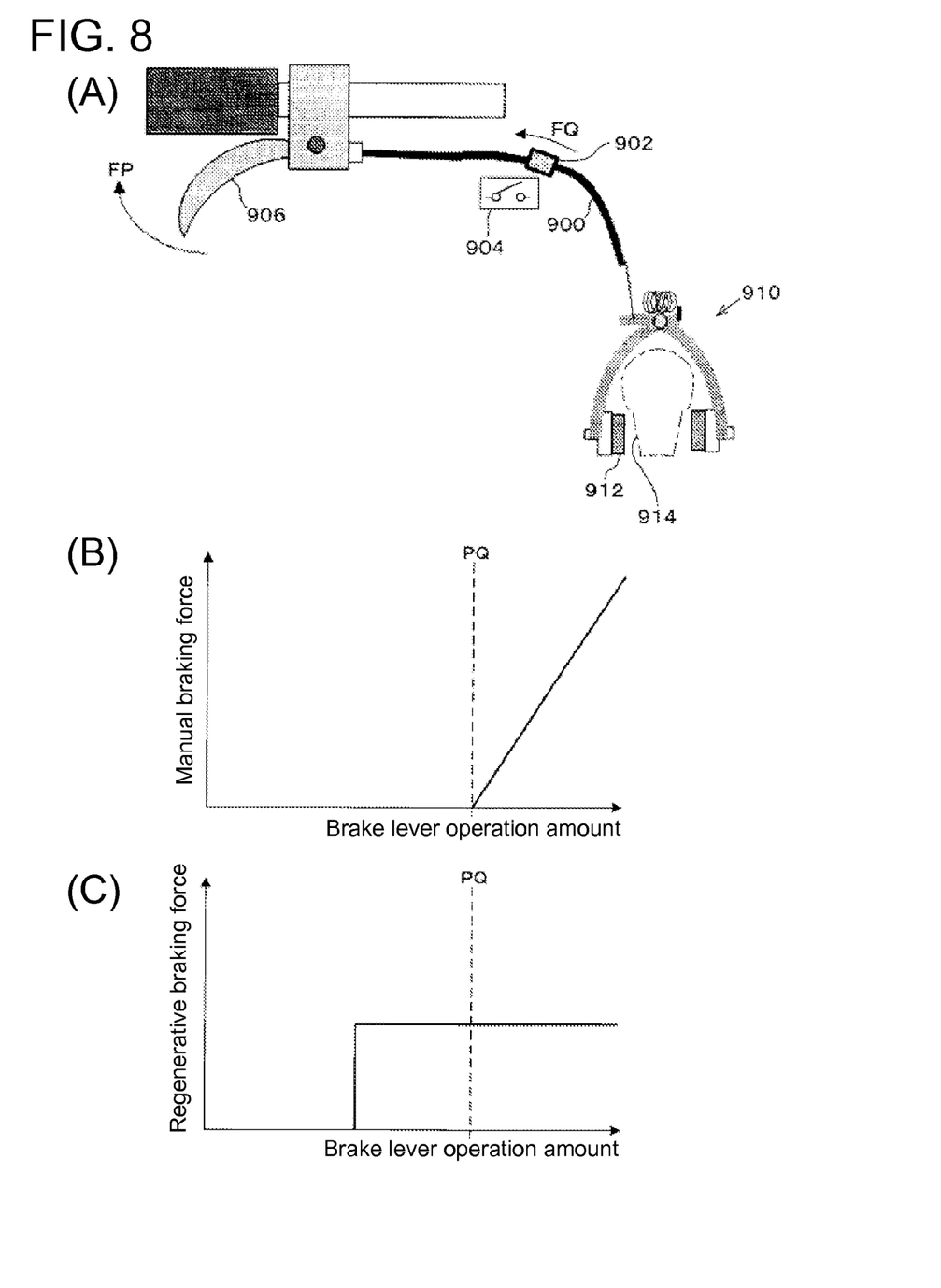
FIG. 8 shows diagrams illustrating a conventional regenerative brake sensor.

Regenerative brake devices for the electric assist bicycles that are currently available in the market employ a regenerative brake switch as shown in FIG. 8(A). That is, a magnet piece 902 is mounted on a brake wire 900, and a reed switch 904 is arranged near the magnet piece. During deceleration, when a user of the bicycle operates a brake lever 906 in the direction indicated by the arrow FP, the brake wire 900 moves in the direction indicated by the arrow FQ. This makes the magnet piece 902 get closer to the reed switch 904, thereby turning the reed switch 904 ON. As a result, a regenerative operation is triggered, and an assist motor is therefore driven in the regenerative mode, starting the regenerative braking. When the brake lever 906 is further operated by the user, brake pads 912 of an actuator 910 start pinching a wheel rim 914 from both sides, thereby creating friction and mechanically slowing down the vehicle.

FIGS. 8(B) and 8(C) show examples of a correspondence relationship between the regenerative brake and the manual brake, which is a frictional brake. In the figures, the horizontal axes indicate an operation amount of the brake lever 906 in the direction indicated by the arrow FP. As shown in FIG. 8(B), at first, even though the brake lever 906 is operated, the manual brake is not actuated. This is because the lever has a play before it makes the brake pads 912 in contact with the rim 914. At a point PQ where the brake pads 912 come in contact with the rim 914, the strong manual brake is applied. The point PQ in the figure is referred to as a manual brake application point.

In contrast, as shown in FIG. 8(C), the regenerative brake is actuated when the reed switch 904 turns ON, and the regenerative braking force is not adjusted in proportion to the operation amount of the brake lever 906. In some bicycles, the regenerative brake switches are provided to both right and left brake levers, respectively, so that the regenerative braking force can be controlled. In such a configuration, when only one brake lever is operated, a weak regenerative braking force is applied, and when both brake levers are operated, a strong generative braking force is applied. However, this only makes it possible to adjust the force in two ways, strong or weak, and this does not provide a linear adjustment of the regenerative braking force in proportion to the operation amount of the brake lever.

In order to effectively recoup kinetic energy or potential energy of a driving vehicle, a sufficient regenerative braking force needs to be provided. When the regenerative braking force is insufficient, a braking force, i.e., a force to stop or slow down a vehicle, becomes insufficient, which makes the user squeeze the brake lever even harder. This actuates a braking force of the manual brake, causing the useful energy to be wasted in the form of heat loss due to the friction between the brake pads and the rim. On the other hand, when the regenerative braking force is excessive, the brake is actuated abruptly when the switch is turned on, and this makes it difficult for users to operate the brake comfortably until they get used to it. In view of these points, it is important to adjust the regenerative braking force appropriately in accordance with the operation amount of the brake lever.

Meanwhile, considering a need for a sudden stop or the like, a conventional manual brake is a fail-safe braking system, and is a necessary system. Therefore, it is desirable to make the regenerative brake capable of coexisting with the manual brake. Further, it is more convenient if the regenerative brake can be attached with ease in vehicle assembly, and can also be compatibly used for various types of vehicles.

The present invention was made in view of the above-mentioned points, and it is an object of the present invention to provide an appropriate regenerative brake that is adjusted in accordance with the force applied by the user to operate the lever. Another object of the present invention is to provide a regenerative brake that can suitably work without sacrificing a function of the manual brake. Yet another object of the present invention is to recoup sufficient energy so as to extend a distance of a vehicle traveling with a single battery charge. Yet another object of the present invention is to provide a regenerative brake device that can be compatibly attached to various types of vehicles.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, a regenerative brake device for a vehicle includes: a manual brake that applies a brake to a wheel of the vehicle by a manual operation of a brake lever; a motor configured to be coupled to a wheel of the vehicle, the motor being driven by a power from a battery, and acting as a regenerative brake that charges the battery with an electromotive force of the motor; a brake sensor that senses an operation amount of the brake lever inclusive of a play of the brake lever in which the manual brake is not yet engaged; and a power control unit that performs regenerative power control for charging the battery with the electromotive force of the motor based on an output signal from the brake sensor so that the regenerative brake is generated in accordance with the operation amount of the brake lever.

In one of the main aspects of the present invention, the brake sensor detects a stretched amount of a brake wire that connects an actuator of the manual brake to the brake lever. In another aspect, the power control unit conducts a power control by Pulse Width Modulation, and controls a duty ratio D in a regenerative mode so as to satisfy $(Vbatt \times D) < Vmotor$, where Vmotor is a counter-electromotive force of the motor, Vbatt is an output of the battery, and D is the duty ratio of the Pulse Width Modulation. Alternatively, the power control unit determines the duty ratio D in accordance with a prescribed data value for converting the operation amount of the brake lever to a desired value for the regenerative brake. Alternatively, the power control unit determines an operation direction of the brake lever, and increases or decreases the duty ratio D accordingly.

In yet another aspect, the regenerative brake device detects a manual brake application point at which the manual brake is actuated, and applies a stronger regenerative brake in a stage subsequent to the manual brake application point as compared with a preceding play stage. Alternatively, the regenerative brake device further includes a wire travel distance sensor that detects a travel distance of the brake wire that is moved when the brake lever is operated, and detects the manual brake application point based on the output signal of the brake sensor and an output signal of the wire travel distance sensor.

An electric assist vehicle according to the present invention includes any one of the above-mentioned regenerative brake devices. In one of the main aspects, the electric assist vehicle includes an alarm unit that is activated when an actuation of the manual brake is recognized by detecting the output signal of the brake sensor to alerts a user of the actuation. In another aspect, a regenerative brake device for a vehicle includes a manual brake configured to apply a brake to a wheel by a manual operation of a brake lever, a motor configured to be coupled to a wheel of the vehicle, the motor being driven by a power from a battery, and acting as a regenerative brake that charges the battery with an electromotive force of the motor, a brake sensor that detects a manual brake application point at which the manual brake is actuated from an operation amount of the brake lever, and a power control unit that performs a regenerative power control for charging the battery with the electromotive force of the motor based on an output signal from the brake sensor so that the regenerative brake is generated in accordance with the operation amount of the brake lever and so that a regenerative braking force becomes greater at the manual brake application point than the regenerative braking force generated before the manual brake application point is reached. In another aspect, the brake sensors include a first brake sensor that detects an operation amount of the manual brake lever, and a second brake sensor that detected an operation force applied to the manual brake lever. Alternatively, the brake sensors include a first brake sensor that detects a travel amount of a brake wire that connects an actuator of the manual brake and the brake lever, and a second brake sensor that detects a stretch of the brake wire that connects the actuator of the manual brake and the brake lever. The above-mentioned and other objectives, features, and advantages of the present invention will become apparent from the detailed descriptions that follow and the accompanying drawings.

EFFECTS OF THE INVENTION

Effects of the present invention are as follows: according to various embodiments of the present invention, the operation amount of the brake lever is detected, and before the manual brake is engaged, a regenerative brake is generated in accordance with the operation amount, i.e., grip strength. This makes it possible to provide a braking force desired by the user of the electric assist vehicle without making him/her feel a gap between the operation amount and the actual braking action. Also, because the regenerative brake is applied before heat is generated due to the manual brake, a loss in the energy caused by the manual brake can be reduced, thereby achieving a suitable energy recapture. As a result, a travel distance of the electric assist vehicle with a single battery charge can be improved. In other words, because the frequency of removing the battery from the vehicle for charging can be reduced, the battery life can be extended. Further, because the function of the manual brake is not sacrificed, safety can be assured, and the regenerative brake device can be mounted on existing electric assist vehicles.

It is to be understood that both the foregoing general description and the following detailed description are exemplary and explanatory, and are intended to provide further explanation of the invention as claimed.

BRIEF DESCRIPTION OF THE DRAWINGS

FIG. 3(A) is a diagram showing an arrangement. FIG. 3(B) is a diagram showing a configuration example. FIG. 3(C) is an explanatory graph showing output characteristics.

FIG. 4(A) is a circuit diagram when a switching element QUA is turned ON. FIG. 4(B) is a circuit diagram when a switching element QUB is turned ON.

FIG. 5(A) is a flowchart showing operation steps. FIG. 5(B) is an explanatory graph for performing a conversion between an output signal of a brake sensor and a desirable regenerative braking force. FIG. 5(C) is an explanatory graph showing a change in a braking amount.

FIG. 8(A) is a schematic view showing an arrangement. FIG. 8(B) is an explanatory graph showing a relationship between an operation amount of a brake lever and a manual braking force. FIG. 8(C) is an explanatory graph showing a relationship between an operation amount of a brake lever and a regenerative braking force.

DETAILED DESCRIPTION OF EMBODIMENTS

Preferred embodiments of the present invention will be explained in detail below with reference to examples.

Embodiment 1

Figure 1:
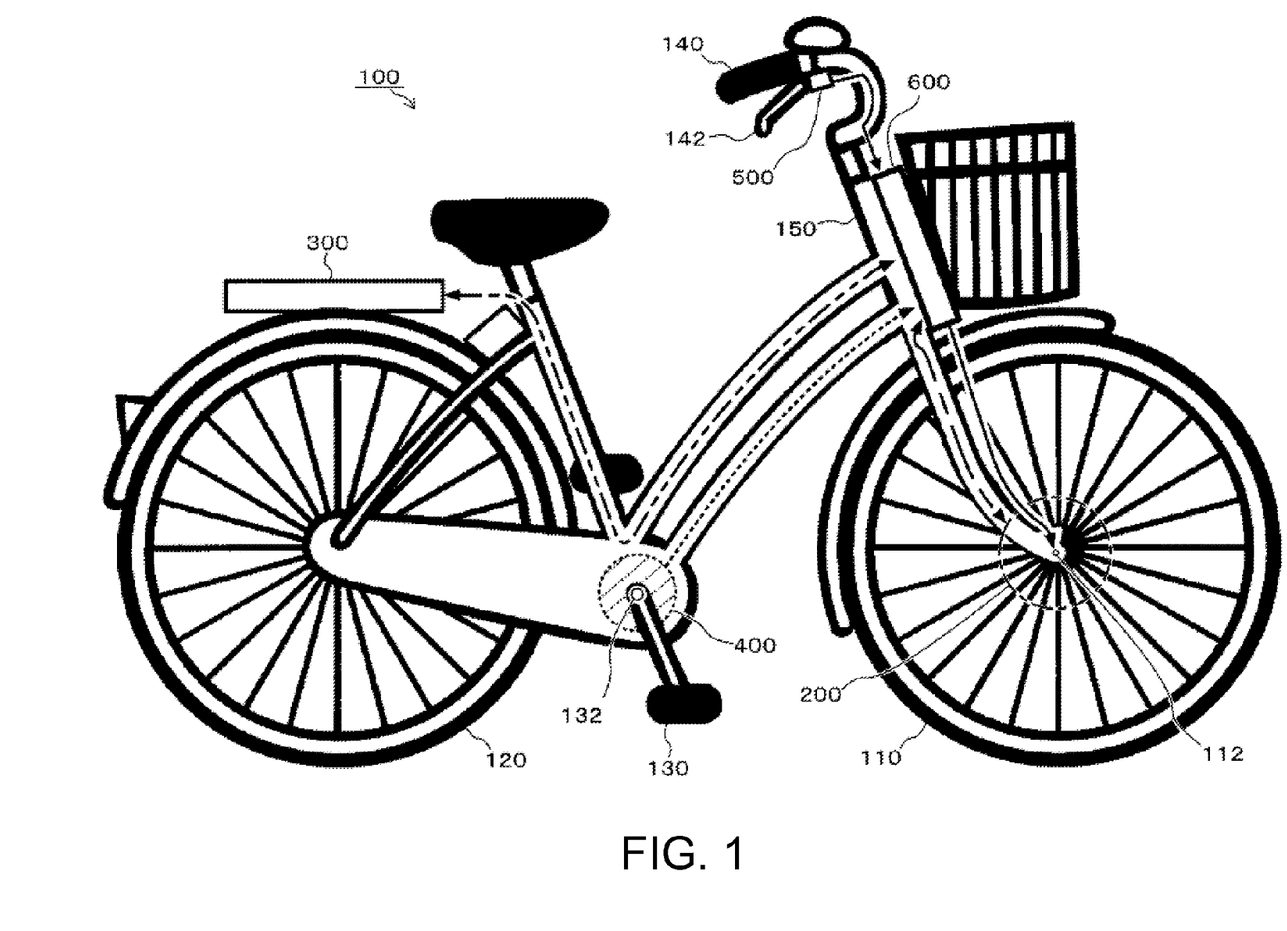
FIG. 1 is a diagram showing one example of an electric assist bicycle that employs the present invention.

First, Embodiment 1 of the present invention will be explained with reference to FIGS. 1 to 5. FIG. 1 shows an overall configuration of a vehicle of this embodiment. This figure shows an example where the present invention is employed in an electric assist bicycle. In the figure, a motor 200 is provided around a hub 112 of a front wheel 110 of an electric assist bicycle 100. A battery (secondary cell) 300 is disposed near a rack of a rear wheel 120. A torque sensor 400 is disposed around a crankshaft 132 of pedals 130, and a brake sensor 500 is disposed near a brake lever 142 of a handlebar 140. Further, a handle stem 150 has a controller 600 on a side facing a front basket. The motor 200, the battery 300, the torque sensor 400, and the brake sensor 500 are connected to the controller 600 by wiring lines arranged along pipes and a fork. An alarm 700 and a brake lever operation amount sensor 800 will be explained in embodiments below.

Figure 2:
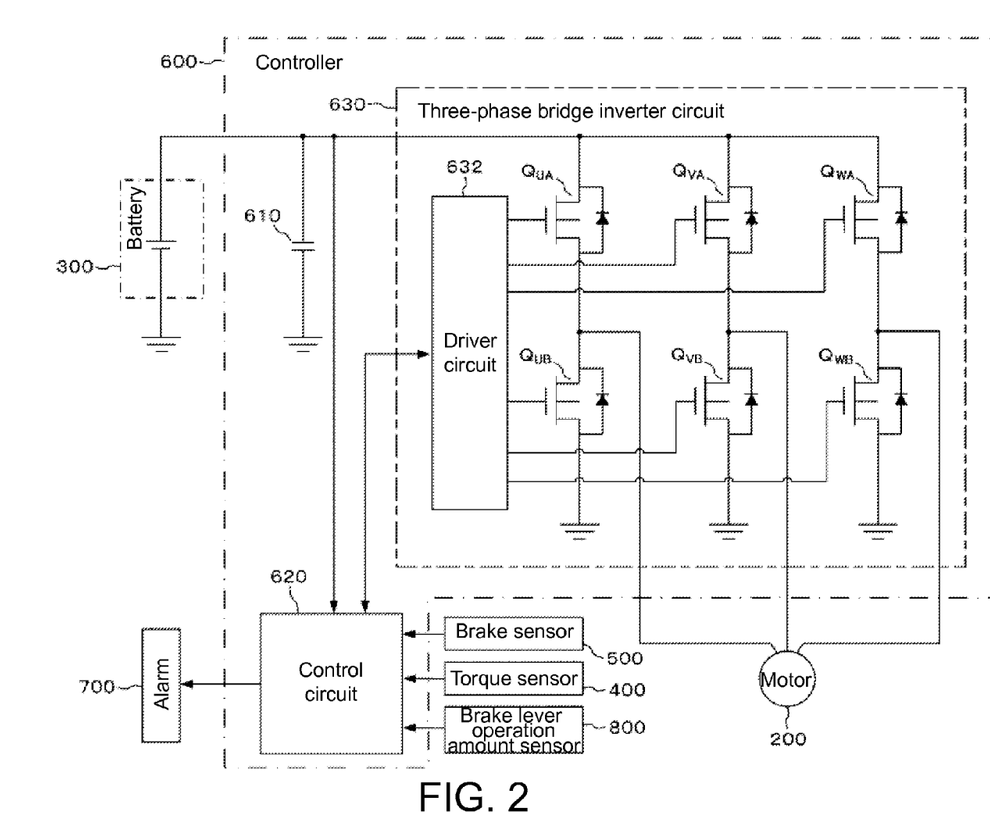
FIG. 2 is a circuit block diagram showing an electrical configuration in one embodiment of the present invention.
Figure 3:
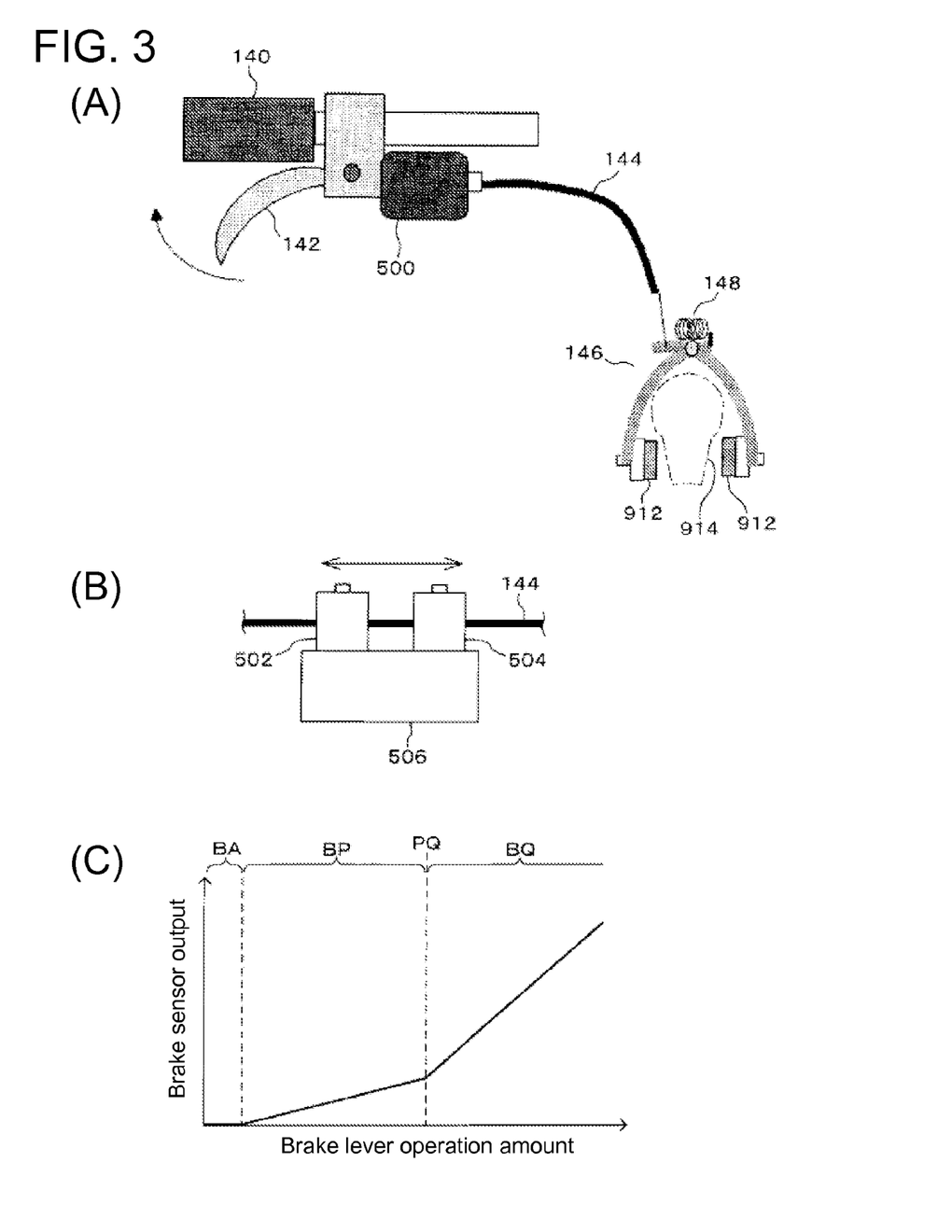
FIG. 3 shows diagrams that schematically illustrate a brake sensor in the embodiment above.

FIG. 2 shows an example of an electrical configuration of the electric assist bicycle 100 that is configured in the above-mentioned manner. In the figure, the motor 200 is constituted of a known three-phase brushless DC motor, for example, and a rotor side thereof is connected to the front wheel 110 of the electric assist bicycle 100. As the battery 300, a known rechargeable battery such as a nickel metal hydride battery or a lithium ion battery is employed, for example. The torque sensor 400 is used to detect a force applied to the pedals 130, i.e., a pedal pressure, and various types of sensors such as a mechanical sensor or a magnetostrictive sensor are known.

The brake sensor 500 is provided near the brake lever 142 as shown in FIG. 3(A), and is used as a sensor to detect a stretched amount of a brake wire 144 connected to an actuator 146. When a user of the electric assist bicycle 100 operates the brake lever 142, the brake wire 144 is initially stretched in proportional to the operation amount. Therefore, by detecting the stretched amount of the brake wire 144, the operation amount of the brake lever 142, and hence the braking amount desired by the user can be detected.

As the brake sensor 500, various known displacement sensors and the like can be used. As shown in FIG. 3(B), for example, the stretched amount of the brake wire 144 is detected by holding two points on the brake wire 144 with fasteners 502 and 504 such as screws, and by measuring a distance between the two points with a sensor 506. In order to detect small tension and displacement of the brake wire 144, an optical displacement sensor can be utilized, for example. As a specific example of this optical displacement sensor, the invention disclosed in Unexamined Japanese Patent Application No. 2009-231845 titled as "Displacement Measurement Method and Displacement Measurement Device" filed by the applicant of the present invention on the same date as the present application can be employed, which is hereby incorporated by reference in its entirety.

In FIG. 3(C), an example of a relationship between the brake lever operation amount and the brake sensor output is shown. In a first region BA where the lever has a play, even if the brake lever 142 is operated, the brake wire 144 does not stretch at all, and therefore, no detection signal is output from the brake sensor 500. Next, in a region BP, the brake lever 142 is operated so as to pull a spring 148 of the actuator 146, causing the brake wire 144 to slightly stretch, and a corresponding detection signal is output from the brake sensor 500. When the user further operates the brake lever 142, and reaches the manual brake application point PQ, the brake wire 144 is stretched significantly, and therefore, in a region BQ, a signal output from the brake sensor 500 is also increased.

Referring to FIG. 2, the controller 600 is constituted of a capacitor 610, a control circuit 620, and a three-phase bridge inverter circuit 630. Among them, the capacitor 610 is disposed on a side closer to the battery 300, and is used for stabilizing a voltage across both ends of the battery 300 and for absorbing a voltage change in the battery 300. The control circuit 620 has a function of conducting a driving control of the three-phase bridge inverter circuit 630 in accordance with detection results of the torque sensor 400 and the brake sensor 500, and battery voltage values.

Among them, the control circuit 620 is mainly constituted of a CPU that operates in accordance with a control program that has been configured in advance. The control circuit 620 also includes a memory that stores the program and various data, which specifically are: values required for calculating a driving speed such as a diameter or a radius of the front wheel; a formula for deriving the driving speed; a formula required for calculating a pedal pressure based on an input signal from the torque sensor 400; a formula required for deriving an output voltage of the motor 200 from the rotation frequency of the motor 200 when the motor 200 is operated as a generator; conversion data or a formula for converting an output from the brake sensor to a required regenerative braking value, which will be later described; a formula for deriving a regenerative duty ratio (duty amount) from the required regenerative braking value; a formula for deriving a driving duty ratio for assist-driving from the detected pedal pressure; a program for conducting a process, which will be later described with reference to a flowchart; and the like.

The three-phase bridge inverter circuit 630 is constituted of a driver circuit 632 and a known inverter circuit that includes a plurality of switching elements (field-effect transistors). The inverter circuit has three phases U, V, and W that respectively have two switching elements QUA and QUB, QVA and QVB, and QWA and QWB that are respectively connected in series. The driver circuit 632 drives the respective switching elements QUA to QWB to perform a switching operation so that, in the assist operation, an assist level is controlled by adjusting a driving power from the battery 300 to the motor 200, and in the regenerative operation, a regenerative level is controlled by adjusting a regenerative power from the motor 200 to the battery 300.

Figure 4:
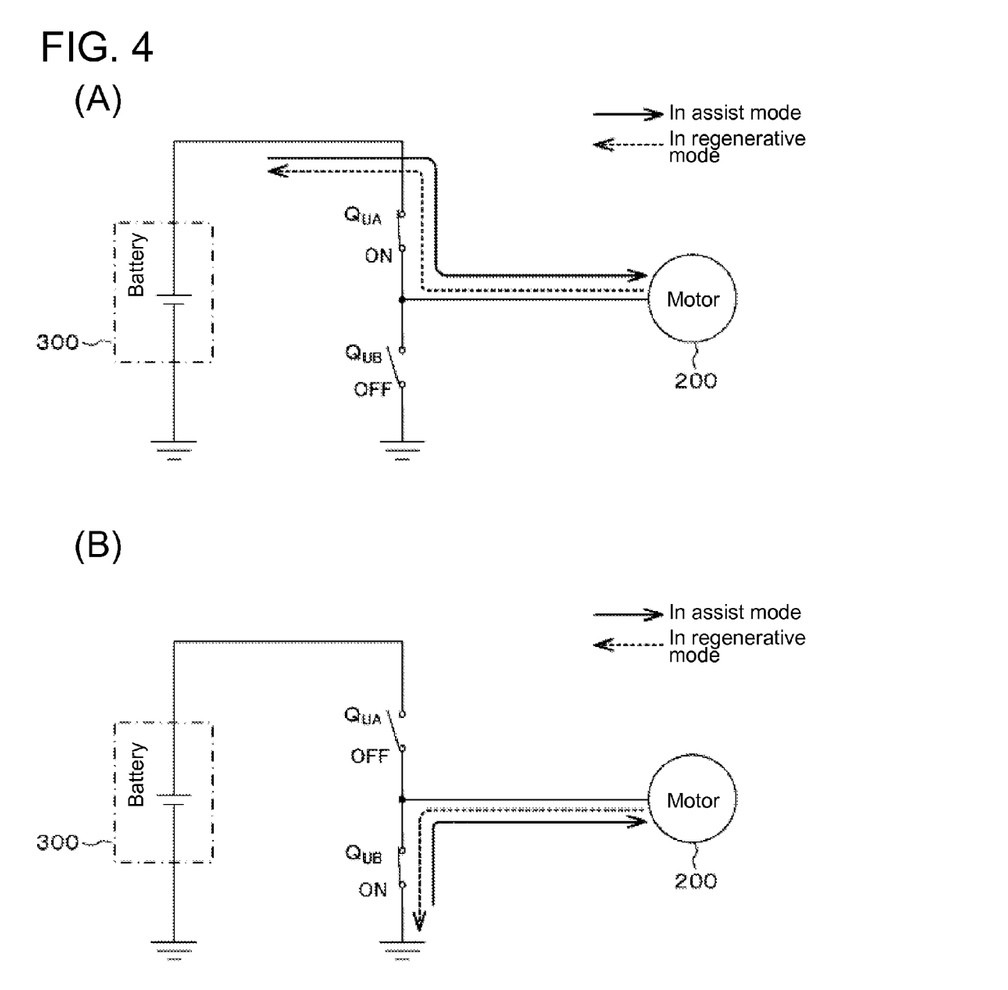
FIG. 4 shows circuit diagrams showing a basic operation of a three-phase bridge inverter circuit in the embodiment above.

FIG. 4 shows diagrams illustrating only a portion corresponding to the switching elements QUA and QUB. When the ON periods of the switching elements QUA and QUB are controlled by PWM (pulse width modulation), an output Vout of the three-phase bridge inverter circuit 630 is represented by Vout=Vbatt×D, where Vbatt is an output of the battery 300, and D is a duty ratio of the PWM. If the duty ratio D is set so as to satisfy Vout=Vmotor, where Vmotor is a counter-electromotive force generated by a rotation of the motor 200, a motor-free state in which neither the assist operation nor the regenerative operation is performed can be obtained. If a vehicle is designed so that the motor voltage becomes 12V at the speed of 12 km/h, for example, when the battery voltage is 24V, the motor-free state where neither the assist operation nor the regenerative operation is performed can be obtained by setting the duty ratio to 50%.

By making the ON period of the switching element QUA longer, and by making the ON period of the switching element QUB shorter as compared with those in the free state so that the duty ratio D is increased, the output Vout of the three-phase bridge inverter circuit 630 as represented by the relationship of Vout=Vbatt×D is increased. This results in changing the relationship of Vout relative to the counter-electromotive force Vmotor of the motor 200, and when Vout>Vmotor is satisfied, the motor 200 is driven to rotate, thereby performing the assist operation. At this time, electric current flows in the directions indicated by solid line arrows in FIG. 4.

In contrast, by making the ON period of the switching element QUA shorter, and by making the ON period of the switching element QUB longer than those in the free state, so that the duty ratio D is decreased, the output Vout of the three-phase bridge inverter circuit 630 as represented by the relationship of Vout=Vbatt×D is decreased. This results in changing the relationship of Vout with the counter-electromotive force Vmotor of the motor 200, and when Vout<Vmotor is satisfied, the motor 200 starts working as a generator, thereby performing the regenerative operation. At this time, electric current flows in the directions indicated by broken line arrows in FIG. 4.

Next, among the overall operations of the present embodiment, an assist operation will be explained. In a manner similar to a known electric assist bicycle, in this operation, when the user pulls away from a stop and starts rotating the pedals 130, the rotation is detected by the torque sensor 400, and at the same time, the detection signal is output to the control circuit 620. The control circuit 620 controls the driver circuit 632 so as to drive the motor 200 to rotate, thereby performing the assist operation.

Figure 5:
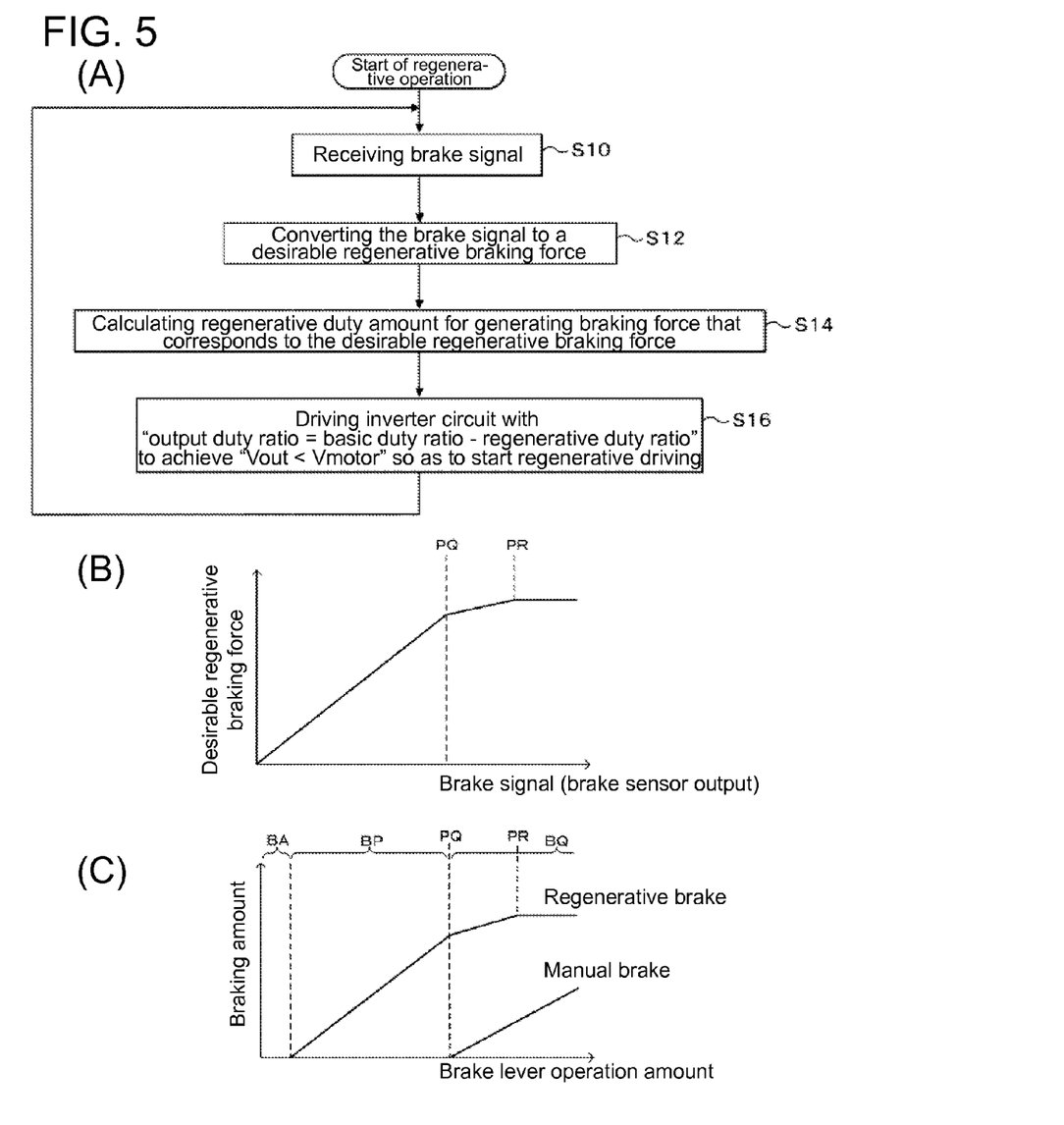
FIG. 5 shows diagrams that illustrate a regenerative brake operation in Embodiment 1 of the present invention.

Next, the regenerative operation will be explained. FIG. 5(A) illustrates steps of the regenerative operation. When the user operates the brake lever 142 to slow down the electric assist bicycle 100, a brake sensor output signal that corresponds to the operation amount is sent from the brake sensor 500 to the control circuit 620 (see a step S10 in FIG. 5(A)). Next, in the control circuit 620, the received signal that is a detection output from the brake sensor is converted to a desirable regenerative braking force in accordance with a graph shown in FIG. 5(B) (step S12). Thereafter, a calculation is performed to obtain a regenerative duty ratio for conducting a regenerative operation so as to generate a braking force corresponding to the desirable regenerative braking force derived by the conversion (step S14). In a graph shown in FIG. 5(B), the slope of the line is greater in a section prior to the manual brake application point PQ, and after the point PQ, the slope of the line becomes smaller. The value reaches a maximum at a point PR. The point PR is a point where the greatest regenerative braking force is generated, and the point PR and the point PQ where the manual brake is actuated desirably coincide with each other. FIG. 5 represents a case where the point PQ and the point PR are slightly off due to variations in the initial setting and the like.

Next, the control circuit 620 performs the following calculation: "an output duty ratio"=("a basic duty ratio"−"a regenerative duty ratio") (step S16). The basic duty ratio is an output duty ratio to the three-phase bridge inverter circuit 630 in the motor-free state where neither the assist nor regenerative operation is performed. The control circuit 620 controls the driver circuit 632 so that a value derived by subtracting the regenerative duty ratio from the basic duty ratio becomes the output duty ratio. As a result, the three-phase bridge inverter circuit 630 performs the regenerative operation with the duty ratio that is lower than the basic duty ratio by the amount corresponding to the regenerative duty ratio, and charges the battery 300 with the power output from the motor 200. The above-mentioned operation is repeatedly performed every time the detection output signal from the brake sensor is received.

The electric assist bicycle 100 slows down by the manual braking force generated from the operation of the brake lever 142, and by the regenerative braking force generated from the regenerative operation. That is, the braking force applied to the electric assist bicycle 100 is the total of the manual braking force shown in FIG. 8(B) and the regenerative braking force that corresponds to a detection output signal from the brake sensor as shown in FIG. 5(B). FIG. 5(C) shows a relationship between the brake lever operation amount and the braking amount. In the initial region BA where the brake lever has a play, neither the manual brake nor the regenerative brake is actuated. In the subsequent region BP, the manual brake is not actuated, but the regenerative brake is applied. In the region BQ subsequent to the manual brake application point PQ, both of the manual brake and the regenerative brake are applied. The regenerative brake reaches a maximum at the point PR. That is, the regenerative brake is gradually applied in accordance with the brake lever operation amount, instead of being abruptly actuated as shown in FIG. 8(C). The operation amount of the brake lever 142 eventually reaches a maximum, and the electric assist bicycle 100 therefore decelerates, ending the charging of the battery 300 by the regenerative operation.

Additionally, as shown in FIG. 5(B), this embodiment is configured such that the regenerative braking force reaches a maximum immediately after the point where the manual brake is actuated. If necessary, another configuration where the regenerative braking force reaches a maximum immediately before the actuation point of the manual brake is also possible. This regenerative braking force is maintained until the bicycle comes close to a stop. This way, the regenerative brake is actuated, and the energy recapture is started before the manual brake is applied, thereby further reducing the amount of energy that is lost as heat in the manual braking that occurs after the point PQ.

As described above, according to the present embodiment, the following effects can be obtained.

(1) A change in the brake wire caused by the operation of the brake lever is detected, and, a regenerative brake is applied with a force that corresponds to the operation amount of the brake lever, i.e., grip strength before the manual brake is engaged. This makes it possible to provide a braking force desired by the user of the electric assist vehicle without making him/her feel a gap between the operation amount and the braking action.

(2) Because the regenerative brake is applied before heat is generated by the manual brake, a loss in the energy caused by the manual brake can be reduced, thereby achieving a suitable energy recapture. As a result, a travel distance of the electric assist vehicle with a single battery charge can be extended. Also, because the frequency of the battery charge is reduced, a battery life can be improved.

(3) The function of the manual brake is not sacrificed, and therefore, safety can be assured. The regenerative brake device can be mounted on existing electric assist vehicles, thereby allowing for a broad range of application.

Embodiment 2

Next, with reference to FIG. 6, Embodiment 2 of the present invention will be explained. In the regions BA and BP shown in FIG. 5(C), the regenerative brake is applied linearly. In this specification, these regions where the manual brake is not actuated even when the user operates the brake lever 142 are referred to as play stages. If the region BQ where the manual brake is activated is to be increased to provide an adequate manual braking action for safety, the play stages BA and BP would need to be reduced. In such a case, the linear control of the regenerative duty ratio would need to be conducted by detecting a change in the brake lever operation amount in a smaller operating range in accordance with data values that have been measured in advance similar to the conversion graph shown in FIG. 5(B). This would create a need to use a high-accuracy, high-capability and expensive sensor as the brake sensor 500.

Also, even if the adequate play stages BA and BP are provided, it is possible that the play stages BA and BP are reduced by the user of the bicycle in performing maintenance or the like. In this case, the operating range would also become smaller, and as a result, the regenerative operation may not be performed sufficiently.

In view of the above-mentioned points, in this embodiment, the control circuit 620 is configured to determine the regenerative duty ratio by identifying only an increase or decrease of the brake sensor output signal, which is, in other words, a direction in which the brake lever is operated, instead of using the conversion graph as shown in FIG. 5(B).

Figure 6:
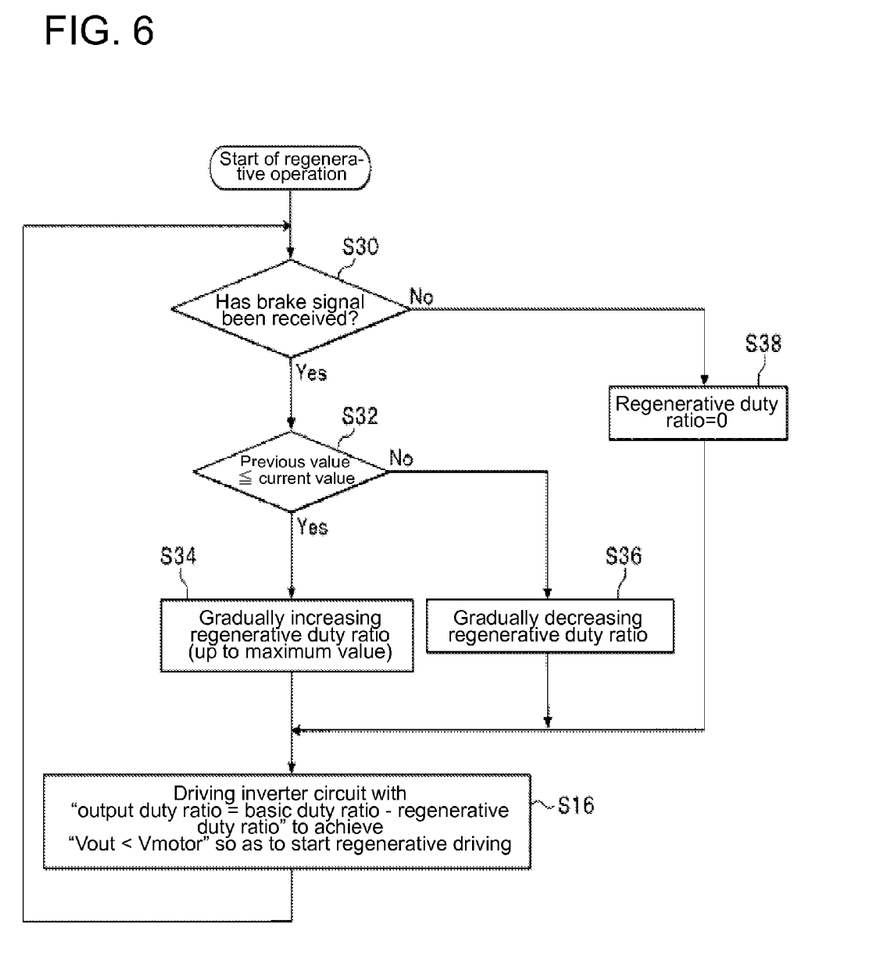
FIG. 6 is a flowchart showing steps of a regenerative brake operation according to Embodiment 2 of the present invention.

FIG. 6 shows a flowchart of the operation. When a brake sensor output signal is input from the brake sensor 500 ("Yes" in a step S30), the control circuit 620 compares the current value of the output signal from the brake sensor with the previous value. If the result is "the previous value≤the current value" ("Yes" in a step S32), it is determined that the user is putting on the brake more strongly, and therefore, the regenerative duty ratio is gradually increased (step S34). That is, the regenerative duty ratio is increased by a certain amount as compared with the regenerative duty ratio that corresponds to the previous brake sensor output signal. In contrast, if the result is "the previous value>the current value" ("No" in a step S32), it is determined that the user is releasing the brake, and therefore, the regenerative duty ratio is gradually decreased (step S36). That is, the regenerative duty ratio is decreased by a certain amount as compared with the regenerative duty ratio that corresponds to the previous brake sensor output signal. When no new brake sensor output signal is received ("No" in the step S30), it is determined that the user is not putting on the brake at all, and therefore, the regenerative duty ratio is set to zero (step S38).

Next, in a manner similar to FIG. 5(A) above, the control circuit 620 performs a calculation of "an output duty ratio"="a basic duty ratio"−"a regenerative duty ratio" (step S16). Thus, by subtracting the regenerative duty ratio from the basic duty ratio, the three-phase bridge inverter circuit 630 performs the regenerative operation with the duty ratio that is lower than the basic duty ratio by the amount corresponding to the regenerative duty ratio. As a result, the battery 300 is charged with the power output from the motor 200. The above-mentioned operation is repeatedly performed every time the detection output signal from the brake sensor is received.

As described above, according to this embodiment, by determining only the direction of the brake operation, even when the play stages BA and BP of the brake lever 142 are reduced, the regenerative duty ratio can be suitably selected, thereby achieving the suitable regenerative operation. In this embodiment, in increasing or decreasing the regenerative duty ratio in the step S34 or S36 in FIG. 6, the value of the increase or decrease amount of the regenerative duty ratio in one cycle may be configured to be greater in certain cases, such as when the output signal of the brake sensor is changed from increase to decrease or when it is increased from zero, as differential elements. This makes it possible to quickly respond to a demand of the user of the bicycle for braking action.

Embodiment 3

Next, Embodiment 3 of the present invention will be explained. In this embodiment, as shown in FIG. 2, the alarm 700 is connected to the control circuit 620. As the alarm 700, an appropriate device, such as a light-emitting device employing a light-emitting diode or the like, or a sounding device employing a piezoelectric element, a speaker, or the like, can be used. When the manual brake is actuated by the increased displacement of the brake wire 144, and the actuation thereof is recognized through the detection signal from the brake sensor 500, the control circuit 620 drives the alarm 700 so as to alert the user of the actuation. Referring to FIG. 5(B), the alarm 700 is activated when the brake sensor output signal that exceeds the signal at the manual brake application point PQ is detected. The manual brake application point PQ can be determined by storing the brake output value at the point PQ in FIG. 5(B) in advance in the memory of the control circuit 620 in FIG. 2. That is, the alarm 700 is controlled such that it is triggered when the brake sensor output signal exceeds the prescribed value.

This makes it possible to make the user of the electric assist bicycle 100 aware that not only the regenerative brake, but also the manual brake is in use. In other words, the user becomes aware of the energy being lost due to the friction caused by the manual brake. That is, by trying not to activate the alarm 700, the user can suppress the unnecessary use of the manual brake, resulting in energy-saving driving with reduced energy loss. This provides an effect similar to that of a fuel efficiency gage equipped in recent automobiles, which allows drivers to visually monitor the fuel efficiency, thereby encouraging them to drive more efficiently. Further, by recording and storing the actuation point of the manual brake, when the actuation point of the manual brake is changed (by wear in brake pads and the like), an alert can be generated to inform the user of the change. This makes it possible to avoid a dangerous situation or the like caused by deterioration in a braking force.

Embodiment 4

Next, with reference to FIGS. 2 and 7, Embodiment 4 of the present invention will be explained. This embodiment relates to a method of detecting the manual brake application point PQ shown in FIG. 3(C). As shown in FIG. 2, this embodiment has a configuration where a sensor for a brake lever operation amount, i.e., a wire travel distance sensor 800, which detects an operation amount of the brake lever 142 by the user of the electric assist bicycle 100, is connected to the control circuit 620.

Figure 7:
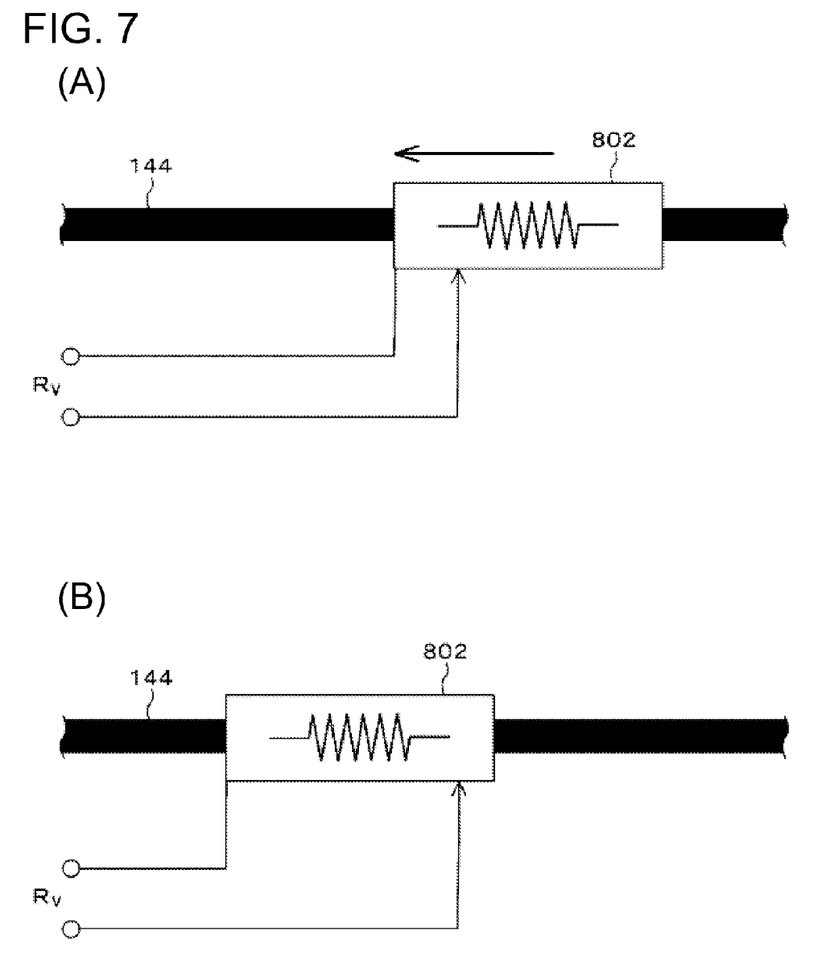
FIG. 7 is a diagram showing an example of a sensor for a brake lever operation amount according to Embodiment 4 of the present invention.

FIG. 7 shows an example of the brake lever operation amount sensor 800. The brake lever operation amount sensor 800 has a configuration where a variable resistor 802 is mounted on the brake wire 144, and a movable element of the variable resistor 802 is affixed to a frame or the like of the electric assist bicycle 100. When the brake lever 142 is operated by the user, the brake wire 144 is moved from the position shown in FIG. 7(A) in a direction indicated by the arrow in the figure. This moves the variable resistor 802, causing a change in position of the movable element thereof, and as a result, a resistance value Rv is changed. Thus, by detecting the change in this resistance value Rv, the wire travel distance when the brake lever 142 is operated by the user can be obtained. This embodiment may also be configured such that the variable resistor 802 is affixed to the frame or the like of the electric assist bicycle 100, and the movable element thereof is attached to the brake wire 144.

Next, an operation of this embodiment will be explained. As shown in FIG. 2, a detection signal from the brake sensor 500 and a detection signal from the brake lever operation amount sensor 800 are input to the control circuit 620, respectively. Where an output from the brake sensor 500 is defined as V, and an operation amount of the brake lever 142, i.e., the travel distance of the brake wire 144, is defined as "y", the manual brake application point PQ, which is a change point in a slope dV/dy of the graph in FIG. 3(C), can be obtained by detecting the slope. That is, because a relationship of (dV/dy in the region BP)<(dV/dy in the region BQ) is satisfied, the value derived by dV/dy is increased at the manual brake application point PQ. Thus, by monitoring the value derived by dV/dy, the manual brake application point PQ can be detected. The above-mentioned calculation and monitoring of dV/dy is performed by the control circuit 620.

In the method described in Embodiment 3 above where the brake output value at the manual brake application point PQ is stored in the memory of the control circuit 620 in advance, the brake sensor output is varied due to variations occurring in the installation of a mechanical brake unit, wear in the brake pads 912, or the like. According to this embodiment, because the effects of such variations can be suppressed, the manual brake application point PQ can be detected accurately. As a result, the regenerative brake can be controlled more suitably.

The present invention is not limited to the above-mentioned embodiments, and various modifications can be made without departing from the scope of the present invention. Examples of the modifications are as follows:

(1) The circuit configuration and the mechanical configuration shown in the embodiments above are examples, and various known devices or components can also be used. As the inverter circuit or the manual brake, for example, various known circuits or brakes may be employed.

(2) Since the present invention relates to regenerative brakes, a configuration for performing the electric assist can be arbitrarily selected, and various known methods may be employed.

(3) Although the most suitable application example of the present invention is the electric assist bicycle, the present invention may also be used for various vehicles such as an electric assist wheel chair.

According to the present invention, a regenerative brake that corresponds to the operation amount of the brake lever can be applied. This makes it possible to provide a braking action that meets a demand of the user while efficiently recouping energy. Thus, the present invention can be suitably used for an electric assist bicycle, an electric assist wheel chair, and the like.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

The invention claimed is:

1. A regenerative brake device for a vehicle, comprising:
    a manual brake that applies a brake to a wheel of the vehicle by a manual operation of a brake lever;
    a motor configured to be coupled to a wheel of the vehicle, the motor being driven by a power from a battery, and also alternatively acting as a regenerative brake that charges the battery with an electromotive force of the motor;
    a brake sensor that senses an operation amount of the brake lever inclusive of a play of the brake lever in which the manual brake is not yet engaged; and
    a power control unit that performs regenerative power control for charging the battery with the electromotive force of the motor based on an output signal from the brake sensor so that the regenerative brake is generated in accordance with the operation amount of the brake lever,
    wherein the power control unit conducts a power control by pulse width modulation, and controls a duty ratio D in a regenerative mode so as to satisfy (Vbatt×D) <Vmotor, where Vmotor is a counter-electromotive force of the motor, Vbatt is an output of the battery, and D is the duty ratio of the pulse width modulation,
    wherein the power control unit performs the regenerative power control such that a regenerative braking force is gradually increased towards a maximum regenerative braking force as the operation amount of the brake lever increases across a manual brake application point at and beyond which the manual brake is engaged, and
    wherein the regenerative braking force continues to increase beyond the manual brake application point towards the maximum regenerative braking force, and a rate of the increase of the regenerative braking force before the manual brake application point is reached is larger than a rate of the increase of the regenerative braking force after the brake application point is reached.

2. The regenerative brake device according to claim 1, wherein the brake sensor detects a stretched amount of a brake wire that connects an actuator of the manual brake to the brake lever.

3. The regenerative brake device according to claim 1, wherein the power control unit determines the duty ratio D in accordance with a prescribed data value for converting the operation amount of the brake lever to a desired value for the regenerative brake.

4. The regenerative brake device according to claim 1, wherein the power control unit determines an operation direction of the brake lever, and increases or decreases the duty ratio D accordingly.

5. The regenerative brake device according to claim 1, wherein the manual brake application point at which the manual brake is actuated is detected, and in a stage subsequent to the manual brake application point, the regenerative brake is applied more strongly as compared with a preceding play stage.

6. The regenerative brake device according to claim 5, further comprising a wire travel distance sensor that detects a travel distance of a brake wire that is moved when the brake lever is operated,
  wherein the manual brake application point is detected based on an output signal of the brake sensor and an output signal of the wire travel distance sensor.

7. An electric assist vehicle comprising the regenerative brake device according to claim 1.

8. The electric assist vehicle according to claim 7, comprising an alarm unit that is activated when an actuation of the manual brake is recognized by detecting the output signal of the brake sensor to alert a user of the actuation.

9. A regenerative brake device for a vehicle, comprising:
  a manual brake configured to apply a brake to a wheel of the vehicle by a manual operation of a brake lever;
  a motor configured to be coupled to a wheel of the vehicle, the motor being driven by a power from a battery, and also alternatively acting as a regenerative brake that charges the battery with an electromotive force of the motor;
  a brake sensor that detects an operation amount of the brake lever, the brake sensor detecting a manual brake application point at which the manual brake is actuated from the operation amount of the brake lever; and
  a power control unit that performs regenerative power control for charging the battery with the electromotive force of the motor based on an output signal from the brake sensor such that a regenerative braking force is gradually increased towards a maximum regenerative braking force as the operation amount of the brake lever increases across the manual brake application point,
  wherein the regenerative braking force continues to increase beyond the manual brake application point towards the maximum regenerative braking force, and a rate of the increase of the regenerative braking force before the manual brake application point is reached is larger than a rate of the increase of the regenerative braking force after the manual brake application point is reached.

10. A regenerative brake device for a vehicle, comprising:
  a manual brake configured to apply a brake to a wheel of the vehicle by a manual operation of a brake lever;
  a motor configured to be coupled to a wheel of the vehicle, the motor being driven by a power from a battery, and also alternatively acting as a regenerative brake that charges the battery with an electromotive force of the motor;
  a brake sensor that detects a manual brake application point at which the manual brake is actuated from an operation amount of the brake lever; and
  a power control unit that performs regenerative power control for charging the battery with the electromotive force of the motor based on an output signal from the brake sensor so that the regenerative brake is generated in accordance with the operation amount of the brake lever and so that a regenerative braking force is generated before the manual brake application point is reached, and said regenerative braking force becomes greater after the manual brake application point than the regenerative braking force generated before the manual brake application point is reached,
  wherein the power control unit performs the regenerative power control such that a regenerative braking force is gradually increased towards a maximum regenerative braking force as the operation amount of the brake lever increases across the manual brake application point, and
  wherein the regenerative braking force continues to increase beyond the manual brake application point towards the maximum regenerative braking force, and a rate of the increase of the regenerative braking force before the manual brake application point is reached is larger than a rate of the increase of the regenerative braking force after the manual brake application point is reached.

\* \* \* \* \*